(12) United States Patent
Takashima et al.

(10) Patent No.: US 9,678,533 B2
(45) Date of Patent: Jun. 13, 2017

(54) PERSONAL DIGITAL ASSISTANT APPARATUS

(71) Applicant: SONY MOBILE COMMUNICATIONS INC., Minato-ku (JP)

(72) Inventors: Kouichiro Takashima, Tokyo (JP); Kazuhiro Kato, Tokyo (JP); Takao Yagi, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 545 days.

(21) Appl. No.: 13/751,713

(22) Filed: Jan. 28, 2013

(65) Prior Publication Data

US 2013/0208412 A1    Aug. 15, 2013

Related U.S. Application Data

(60) Provisional application No. 61/598,608, filed on Feb. 14, 2012.

(51) Int. Cl.
*G06F 1/16* (2006.01)

(52) U.S. Cl.
CPC .......... *G06F 1/1601* (2013.01); *G06F 1/1656* (2013.01)

(58) Field of Classification Search
CPC ......... G06F 1/1656; G06F 1/16; G06F 1/1601
USPC ........................................ 361/679.3; 9/679.3
See application file for complete search history.

(56) References Cited

U.S. PATENT DOCUMENTS

| 4,044,182 | A | * | 8/1977 | Aizawa | ..................... B27L 5/00 |
|---|---|---|---|---|---|
| | | | | | 144/332 |
| 4,679,341 | A | * | 7/1987 | Goldman | ................... 40/611.06 |
| 5,943,113 | A | * | 8/1999 | Ichihashi | ....................... 349/187 |
| 6,297,792 | B1 | * | 10/2001 | Takahashi | ........................ 345/91 |
| 2007/0115692 | A1 | * | 5/2007 | Yao | ................................ 362/632 |
| 2010/0124043 | A1 | * | 5/2010 | Lee et al. | ..................... 362/97.1 |
| 2010/0246163 | A1 | * | 9/2010 | Chen | ................. G02F 1/133608 |
| | | | | | 362/97.1 |
| 2012/0121855 | A1 | * | 5/2012 | Dai | ............................ C09J 5/00 |
| | | | | | 428/138 |
| 2012/0169961 | A1 | * | 7/2012 | Ha et al. | ......................... 349/61 |

FOREIGN PATENT DOCUMENTS

| JP | 08036337 A | * | 2/1996 |
|---|---|---|---|
| JP | 2006-106063 | | 4/2006 |
| JP | 2006244842 A | * | 9/2006 |

OTHER PUBLICATIONS

English Translation JP 2006244842 A Sep. 2006 Takuma, Masaaki.*

(Continued)

*Primary Examiner* — Dion R Ferguson
*Assistant Examiner* — Mandeep S Buttar
(74) *Attorney, Agent, or Firm* — Oblon, McClelland, Maier & Neustadt, L.L.P.

(57) ABSTRACT

An information processing apparatus including a display portion, and a casing including an inner circumference wall portion that faces a side wall of the display portion and an inner circumference bottom plane portion that faces a rear surface of the display portion. The display portion is secured to the inner circumference wall portion and the inner circumference bottom plane portion of the casing with an adhesive agent.

15 Claims, 17 Drawing Sheets

(56) References Cited

OTHER PUBLICATIONS

Machine translation of JP 08036337A.*
http://www.adhesives.org/adhesives-sealants/adhesives-sealants-overview/adhesive-technologies/chemically-curing/two-component-(2-c)/urethane-adhesives, 2008.*
U.S. Appl. No. 13/749,276, filed Jan. 24, 2013, Kato, et al.

* cited by examiner

PERSONAL DIGITAL ASSISTANT APPARATUS

CROSS REFERENCE TO RELATED APPLICATION

The present application claims the benefit of the earlier filing date of U.S. Provisional Patent Application Ser. No. 61/598,608 filed on Feb. 14, 2012, the entire contents of which is incorporated herein by reference.

BACKGROUND

Field of the Disclosure

The present disclosure relates to a personal digital assistant apparatus suitable for being applied to electronic equipment including a display unit, for example, such as a cellular phone, a PHS phone (PHS: Personal Handyphone System), a PDA apparatus (PDA: Personal Digital Assistant), an electronic camera device, an electronic video camera device, a portable game machine, a notebook-type personal computer device, or the like. In particular, the present disclosure relates to a personal digital assistant apparatus whereby, of a casing of electronic equipment to which the present disclosure has been applied, the width of a portion called a frame surrounding the display unit can be narrowed (narrow framing).

Description of Related Art

As for cellular phones in today, cellular phones called smart phones, in which a display unit (touch panel) is provided whereby contact operations are available as to a wide area portion of a rectangular casing, are mainstream.

In the case of such cellular phones, a display unit having a somewhat smaller area than the above wide area portion is provided. Therefore, the circumference of the display unit is surrounded with a casing of such a cellular phone. A portion of the casing surrounding this display unit is called a "frame".

FIG. 17 is a diagram illustrating a cross section obtained by cutting away such a cellular phone along the transverse direction.

As illustrated in this FIG. 17, the display unit of this personal digital assistant apparatus is formed by mutually gluing a display unit 100, for example, such as a liquid crystal display unit, organic EL display unit (Organic Electro Luminescence) or the like to a lens 101 via a lamination member 102.

A backlight unit 104 is provided between a rear frame 103 and the display unit 100, and irradiates light on this display unit 100. This backlight unit 104 is surrounded with a backlight frame 105 having generally the same thickness as that of this backlight unit 104. This backlight frame 105 principally protects the backlight unit 104 from force applied in the thickness direction of this cellular phone.

Also, the backlight frame 105 is glued to the display unit 100 via a tape 106, and also glued to a reflector 108 of the backlight unit 104 via a tape 107.

Also, the backlight unit 104 of which the reflector 108 is glued to the backlight frame 105 is configured to come into contact with the rear frame 103 via a cushion sheet 109 at the time of this cellular phone being assembled.

Also, this cellular phone includes a side cabinet 110 and a rear cabinet 111 which make up the outer circumference portion of this cellular phone. The edge portions of the rear cabinet 111 and rear frame 103 are connected to the side cabinet 110 via a tape 112.

Also, an edge portion of the lens 101 of the display unit is mounted onto the side cabinet 110 having a cross-sectional generally L-letter shape as illustrated in FIG. 17 at the time of this cellular phone being assembled.

A portion where the edge portion of the lens 101 of this display unit, and the side cabinet 110 are overlapped is configured to be applied with an adhesive agent 113 using a dispenser apparatus 120 illustrated in FIGS. 18A and 18B.

Specifically, the adhesive agent 113 is automatically applied to an adhesive agent applied portion 110a of the side cabinet 110 by the dispenser apparatus 120 as illustrated in FIG. 19A, and is also automatically applied to an edge portion 101a of the lens 101 of the display portion by the dispenser apparatus 120 as illustrated in FIG. 19B.

Thus, the display unit and the side cabinet 110 are glued via the adhesive agent 113 at the time of this cellular phone being assembled.

SUMMARY

However, in order to automatically apply a viscous adhesive agent 113 in a seamless manner using a machine called the dispenser apparatus 120, an inner diameter A of a nozzle of the dispenser apparatus 120 illustrated in FIG. 18A has to be formed with a certain degree of great diameter.

In the event of having increased the inner diameter A of the nozzle of the dispenser apparatus 120, an outer diameter B of the nozzle of the dispenser apparatus 120 has also been increased along therewith. The width of the adhesive agent in the event of having been applied has generally the same size as the outer diameter B of this nozzle.

Therefore, the adhesive agent applied portion 110a of the side cabinet 110 with which an edge portion of the lens 101 of the display portion is overlapped has to have a wide range so as to be applied with the adhesive agent 113 in an automatically seamless manner even when the nozzle of the dispenser apparatus 120 has a great diameter.

In other words, the size of the side cabinet 110 has to have the same size as with the diameter of the nozzle of the dispenser apparatus 120. This has been a first cause for the side cabinet 110 being increased.

With regard to the width of the side cabinet 110, in the event of increasing the side cabinet 110 to form the frame of a display portion 130 as illustrated in FIG. 20, the frame of the display portion 130 has a wide range as illustrated in FIG. 20, which causes an inconvenience in that the design of the cellular phone is compromised.

On the other hand, the side cabinet 110 has been expected to satisfy both of rigidity for enduring external shock applied to this cellular phone, and shock absorbability for absorbing external shock to protect the internal circuits.

As for a member for forming the side cabinet 110, a plastic member having a certain degree of rigidity and elasticity is employed, such as ABS resins (ABS: Acrylonitrile, Butadiene, Styrene), a PET resin (PolyEthylene Terephthalate), or the like.

However, cellular phones have been expected to have predetermined rigidity and shock absorbability. In order to have a cellular phone include the publicly expected rigidity and shock absorbability, the side cabinet 110 has to have a size satisfying the expected rigidity and shock absorbability.

This has been a second cause for the side cabinet 110 being increased. As described above, in the event of increasing the side cabinet 110, the frame of the display portion 130 has a wide range as illustrated in FIG. 20, which causes an inconvenience in that the design of the cellular phone is compromised.

Note that the side cabinet 110 is formed of a metal member such as an aluminum member or the like, whereby the side cabinet 110 having rigidity can be formed.

However, in the event of the side cabinet 110 having being formed with a metal member, shock absorbability will be lost, and accordingly, externally applied shock will be transmitted to the internal circuits, which causes a problem in that it is difficult to protect the internal circuits and so forth.

The inventor recognized an advantage of a cellular phone having the publicly expected rigidity and shock absorbability, and also having potential for narrow framing.

According to one exemplary embodiment, the disclosure is directed to an information processing apparatus including a display portion, and a casing including an inner circumference wall portion that faces a side wall of the display portion and an inner circumference bottom plane portion that faces a rear surface of the display portion. The display portion is secured to the inner circumference wall portion and the inner circumference bottom plane portion of the casing with an adhesive agent.

Also, with the present disclosure, the outer circumference casing includes an adhesive agent holding unit for holding the applied adhesive agent at a predetermined location.

According to the present disclosure, in addition to the expected rigidity and shock absorbability being satisfied, narrow framing can be realized.

DETAILED DESCRIPTION

The present disclosure can be applied to a cellular phone as an example.

First Embodiment

Configuration of Cellular Phone

Figure 1:
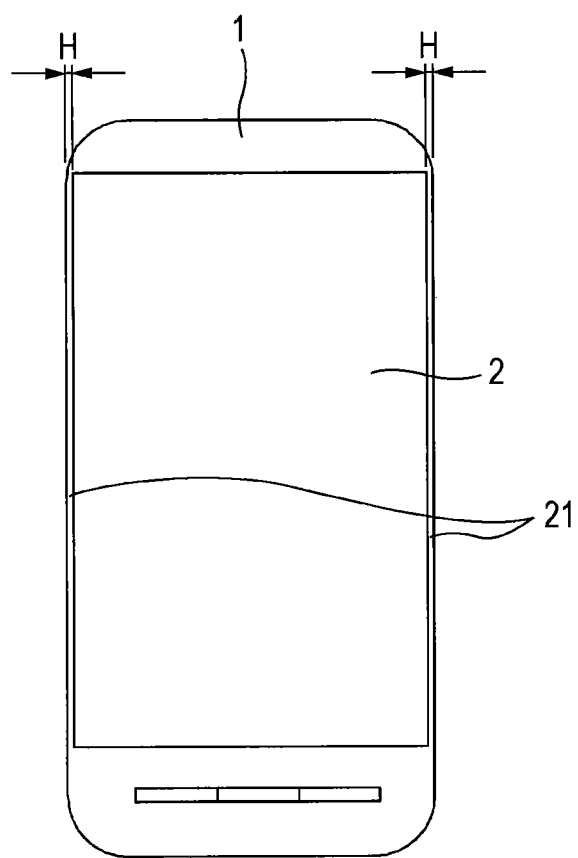
FIG. 1 is a front view of a cellular phone serving as a first embodiment to which the present disclosure has been applied.

FIG. 1 is a front view of a cellular phone serving as a first embodiment of the present disclosure. As illustrated in FIG. 1, the cellular phone according to the present embodiment includes a display portion 2 (touch panel) whereby contact operations can be performed at one wide area portion 1 (or may be both of one and the other) of a long-plate-shaped casing.

This display portion 2 has a somewhat smaller area than the wide area portion 1. Therefore, the circumference of the display portion 2 is surrounded with the casing of this cellular phone. This portion of the casing surrounding the display portion 2 is referred to as a "frame".

The cellular phone according to the present embodiment is a cellular phone whereby the width of the portion called "frame" can be narrowed (narrow framing), as described below.

Figure 2:
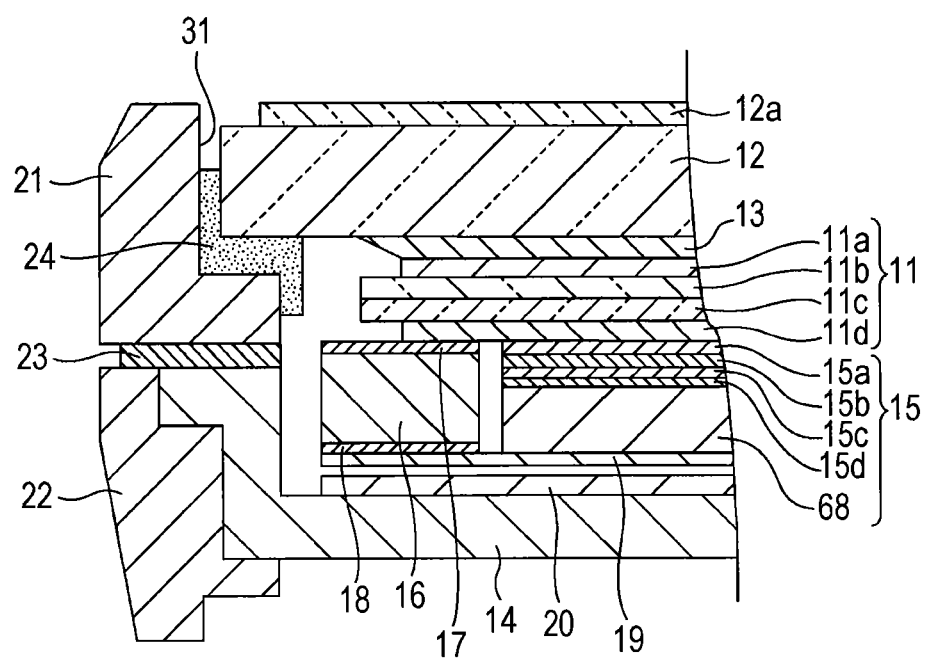
FIG. 2 is a diagram illustrating a cross section obtained by cutting away the cellular phone serving as the first embodiment along the transverse direction.

FIG. 2 is a diagram illustrating a cross section obtained by cutting away such a cellular phone along the transverse direction.

As illustrated in this FIG. 2, the display portion 2 of this personal digital assistant apparatus is formed by mutually gluing a display unit 11, for example, such as a liquid crystal display unit or organic EL display unit (Organic Electro Luminescence) or the like, to a lens 12 to which a scattering prevention film 12a is glued on the face portion side where an operator performs contact operations, via a lamination member 13.

The scattering prevention film 12a functions so as to prevent an inconvenience of broken pieces of the lens 12 scattering at the time of damage or the like, from occurring at the lens 12. Also, this scattering prevention film 12a functions so as to protect the lens 12 from cracks, dust, or the like. Further, this scattering prevention film 12a functions so as to improve sliding of a finger or the like at the time of contact operations to improve operability.

The lens 12 functions so as to secure the strength of the display unit 11. Also, with this lens 12, an electrode layer for detecting contact operations is provided.

The display unit 11 is formed by sequentially laminating an upper polarizing plate 11a, color filter glass 11b, TFT glass 11c (TFT: Thin Film Transistor), and a lower polarizing plate 11d. The lens 12 is glued to the upper polarizing plate 11a of this display unit 11 via the lamination member 13.

The upper polarizing plate 11a functions so as to selectively transmit light with a polarization angle being changed by liquid crystal elements being driven to the upper portion.

The color filter glass 11b functions so as to transmit light to be transmitted by converting the light into one color of red, green, and blue. The liquid crystal elements are sealed by this color filter glass 11b and TFT glass 11c.

With the TFT glass 11c, circuits which enable application of different voltage for each place are formed in a grid shape. This TFT glass 11c and the color filter glass 11b seal the liquid crystal elements.

The lower polarizing plate 11d functions so as to have light irradiated toward the liquid crystal elements sealed by the color filter glass 11b and TFT glass 11c polarize (the direction of light vibration is restricted).

A backlight unit 15 which irradiates light on the display unit 11 is provided between a rear frame 14 and the display unit 11.

This backlight unit 15 is formed by sequentially laminating first through fourth light diffusion films 15a through 15d of which the light diffusion ratios have each been adjusted, and a light guide 68 which realizes the diffusion and condensing of the light emitted from a light emitting unit, for example, such as a light emitting diode (LED) or the like.

The first through fourth light diffusion films 15a through 15d function so as to diffuse or condense the light irradiated from the light guide 68.

Such a backlight unit 15 is surrounded by a backlight frame 16 having generally the same thickness as this backlight unit 15. This backlight frame 16 principally protects the backlight unit 15 from force applied in the thickness direction of this cellular phone or the like.

Also, the backlight frame 16 is glued to the display unit 11 via a tape 17, and also glued to a reflector 19 of the backlight unit 15 via a tape 18.

Also, the backlight unit 15 of which the reflector 19 is glued to the backlight frame 16 is configured so as to come into contact with the rear frame 14 via a cushion sheet 20 at the time of this cellular phone being assembled.

Also, this cellular phone has a side cabinet 21 and a rear cabinet 22 which make up the outer circumference portion of this cellular phone.

The side cabinet 21 has a "generally L-letter shaped" cross section as illustrated in FIG. 2, and is formed of a metal member, for example, such as aluminum or the like. Therefore, this side cabinet 21 has rigidity as to external shock.

Also, this side cabinet 21 is connected to the edge portions of the rear cabinet 22 and rear frame 14 via a tape 23.

Also, the edge portion of the lens 12 of the display portion 2 is mounted onto the side cabinet 21 having a generally L-letter shaped cross section as illustrated in FIG. 2 at the time of this cellular phone being assembled.

An adhesive agent 24 is arranged to be automatically applied to the edge portion of the lens 12 of the display portion 2, and the side cabinet 21 by the dispenser apparatus.

Specifically, in the case of the cellular phone according to the present embodiment, narrowing is realized by forming the side cabinet 21 using a metal member such as an aluminum member or the like.

In order to automatically apply the viscous adhesive agent 24 to the side cabinet 21 which realizes such narrowing in a seamless manner using the dispenser apparatus, the inner diameter of the nozzle of this dispenser apparatus has to have a certain degree of great diameter.

In the event of having increased the inner diameter of the nozzle of the dispenser apparatus, along therewith, the outer diameter of the nozzle of the dispenser apparatus has also been increased. The width of the adhesive agent 24 at the time of being applied is generally the same as the outer diameter of this nozzle. Also, the center of application of the adhesive agent 24 is set in light of component intersection such as the side cabinet 21 and so forth.

Figure 3A:
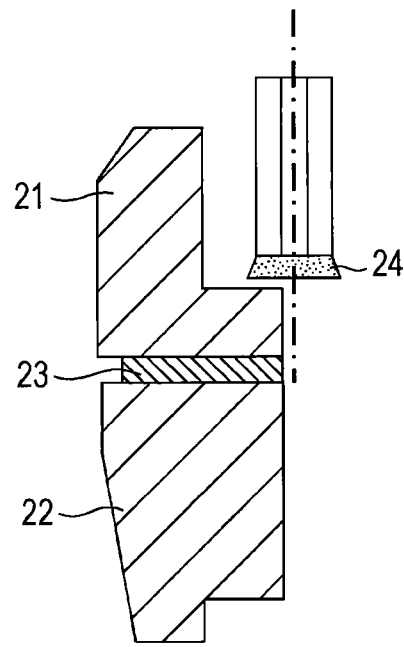
FIGS. 3A and 3B are diagrams for describing inconvenience that is caused in the event of applying an adhesive agent to a side cabinet of which narrowing has been realized, and an edge portion of a lens of a display portion using a linear-shaped nozzle of a dispenser apparatus.

Therefore, in the event of attempting to apply the adhesive agent 24 to the side cabinet 21 which realizes narrowing, using the linear-shaped nozzle of the dispenser apparatus, the center of application of the adhesive agent 24 deviates, as illustrated in a dashed dotted line in FIG. 3A, from the side cabinet 21, and accordingly, it is difficult to accurately apply the adhesive agent 24.

Also, the edge portion of the lens 12 of the display portion 2 to which the adhesive agent 24 is applied is also the same, the side cabinet 21 is subjected to narrowing, thereby narrowing the portion of the edge portion of the lens 12 overlapped with this side cabinet 21 is also narrowed.

Figure 3B:
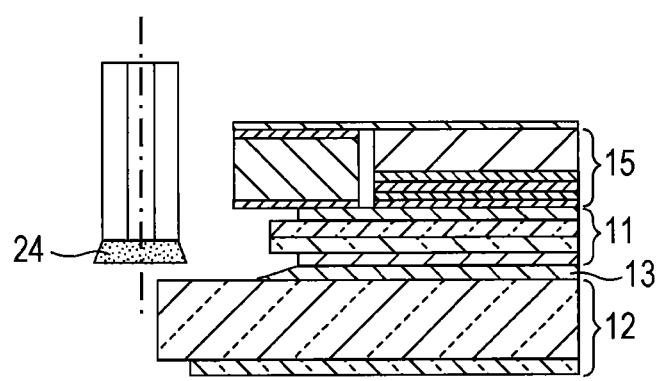

Therefore, in the event of attempting to apply the adhesive agent 24 to the edge portion of the lens 12 of which the portion overlapped with the side cabinet 21 is narrowed using the linear-shaped nozzle of the dispenser apparatus, the center of application of the adhesive agent 24 deviates, as illustrated in a dashed dotted line in FIG. 3B, from the edge portion of the lens 12, and it is difficult to accurately apply the adhesive agent 24.

Figure 4A:
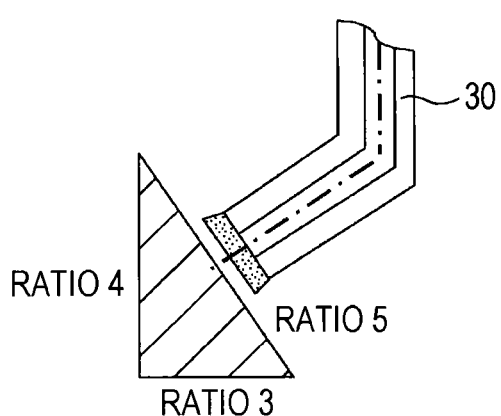
FIGS. 4A-4C are diagrams for describing a dispenser apparatus having a nozzle subjected to bend processing.

Therefore, as illustrated in FIG. 4A, a nozzle 30 of a dispenser apparatus which applies an adhesive agent to the cellular phone according to the present embodiment has been subjected to bend processing with the angle of an adhesive agent to be vertically emitted to the oblique side of a right-angled triangle of which the three sides have a proportion of 3:4:5.

Figure 4B:
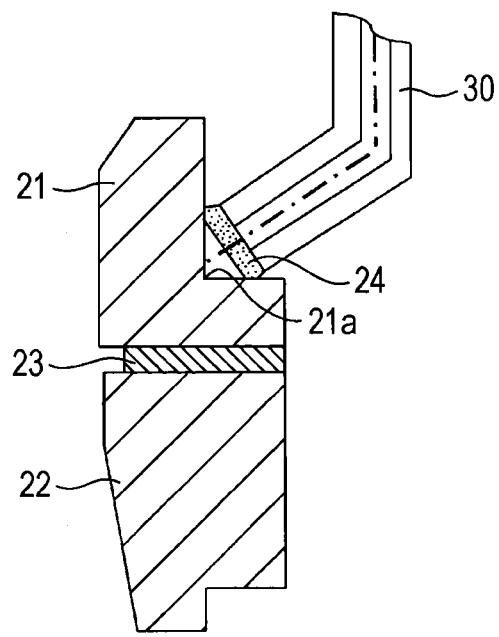

In the event of applying the adhesive agent 24 to the side cabinet 21, the adhesive agent 24 is applied to the side cabinet 21 with a corner portion 21a of the side cabinet 21 as the center as illustrated in FIG. 4B, using the nozzle 30 subjected to this bend processing.

Figure 4C:
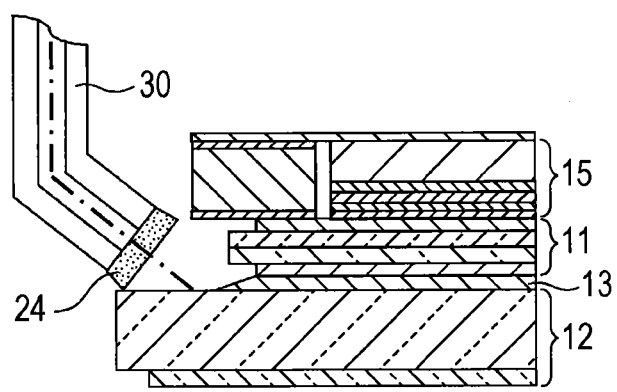

Also, in the event of applying the adhesive agent 24 to the edge portion of the lens 12 of the display portion 2, the adhesive agent 24 is obliquely applied to the edge portion of the lens 12 of the display portion 2 as illustrated in FIG. 4C, using the nozzle 30 subjected to this bend processing.

Figure 5A:
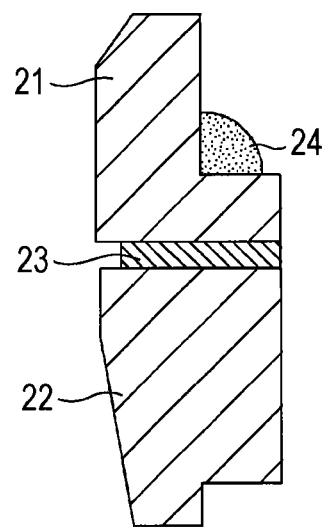
FIGS. 5A-5B are diagrams illustrating a scene where an adhesive agent is applied to the side cabinet of which narrowing has been realized, and the edge portion of the lens of the display portion using the nozzle subjected to bend processing of the dispenser apparatus.
Figure 5B:
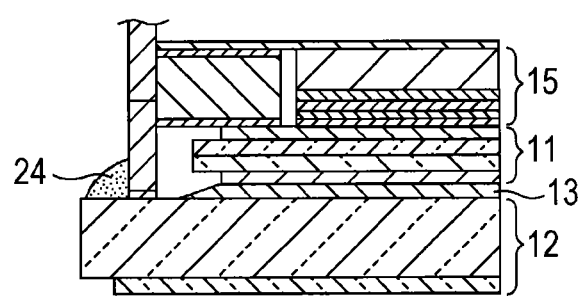

Thus, as illustrated in FIG. 5A, the adhesive agent 24 can automatically be applied in a manner loaded onto the side cabinet 21 subjected to narrowing. Also, as illustrated in FIG. 5B, the adhesive agent 24 can also automatically be applied to the edge portion of the lens 12 of the display portion 2 subjected to narrowing in a manner mounted onto the edge portion of this lens 12.

[Assembly Process of Rear Cabinet Assembly]

Next, an assembly process of the rear cabinet assembly of this cellular phone will be described. As the assembly process of the rear cabinet assembly, there are "pre-adhesion process" wherein the lens 12 of the display portion 2, and the side cabinet 21 are previously glued by the adhesive agent 24, and the display unit 11 or backlight unit 15 or the like is then glued thereto, and "post-adhesion process" wherein the display unit 11 or backlight unit 15 or the like is previously glued to the lens 12 of the display portion 2, and this lens 12 and side cabinet 21 are glued by the adhesive agent 24.

[Pre-Adhesion Process]

Figure 6A:
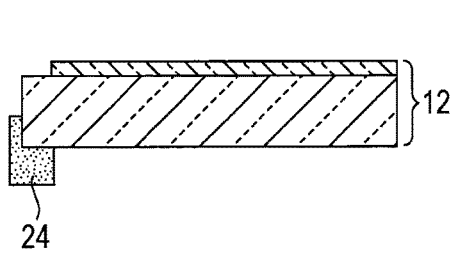
FIGS. 6A-6E are diagrams for describing an assembly process according to a pre-adhesion process of rear cabinet assembly of the cellular phone serving as the first embodiment to which the present disclosure has been applied.

FIGS. 6A-6E illustrate the assembly process of the rear cabinet assembly according to the pre-adhesion process. In the event of assembling the rear cabinet assembly by the pre-adhesion process, first, as illustrated in FIG. 6A, the adhesive agent 24 is obliquely applied to the edge portion of the lens 12 of the display portion 2 using the nozzle 30 subjected to this bend processing. Also, the adhesive agent 24 is also applied to the side cabinet 21 using the nozzle 30 subjected to this bend processing.

Figure 6B:
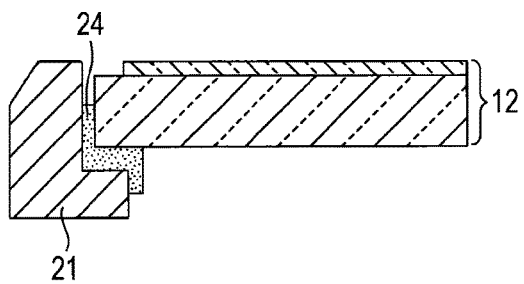

Next, as illustrated in FIG. 6B, the edge portion of the lens 12 of the display portion 2 to which the adhesive agent 24 has been applied is mounted onto the side cabinet 21 to which the adhesive agent 24 has similarly been applied, and this mounted state is maintained for a predetermined period of time (e.g., one minute to two minutes). Thus, the adhesive agent 24 is dried, and accordingly, the lens 12 of the display portion 2, and the side cabinet 21 are glued via the adhesive agent 24.

Figure 6C:
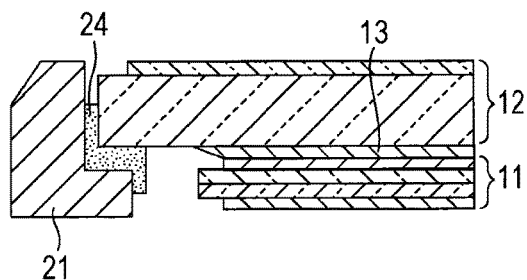

Next, the display unit 11 is glued to the lens 12 of the display portion 2 glued to the side cabinet 21 via a lamination 13 as illustrated in FIG. 6C.

Figure 6D:
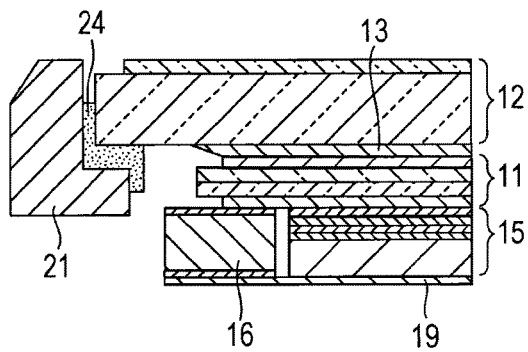

Next, as illustrated in FIG. 6D, the backlight unit 15 is glued to the display unit 11, and the backlight frame 16 is mounted so as to surround this backlight unit 15.

Figure 6E:
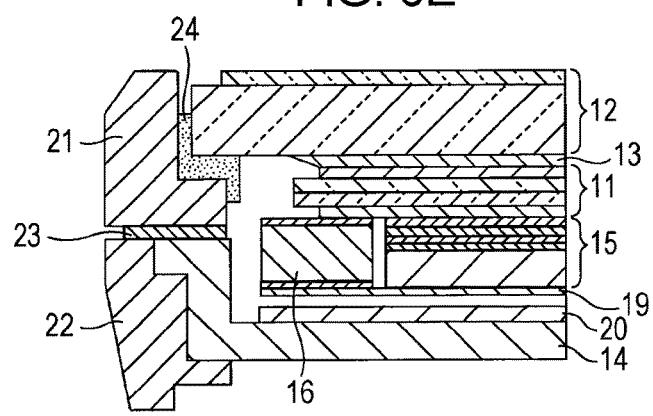

Finally, as illustrated in FIG. 6E, the cushion sheet 20 is laid between the rear frame 14 and the reflector 19 of the backlight unit 15, and also the rear cabinet 22, and the edge portion of the rear frame 14 are glued to the side cabinet 21 via a tape 23, thereby completing assembly of the rear cabinet assembly.

[Post-Adhesion Process]

Figure 7A:
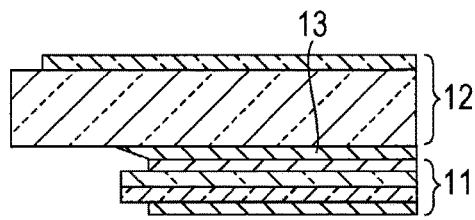
FIGS. 7A-7E are diagrams for describing an assembly process according to a post-adhesion process of rear cabinet assembly of the cellular phone serving as the first embodiment to which the present disclosure has been applied.

Next, FIGS. 7A-7E illustrate the assembly process of the rear cabinet assembly according to the post-adhesion process. In the event of assembling the rear cabinet assembly by the post-adhesion process, first, as illustrated in FIG. 7A, the display unit 11 is glued to the lens 12 of the display portion 2 via the lamination 13.

Figure 7B:
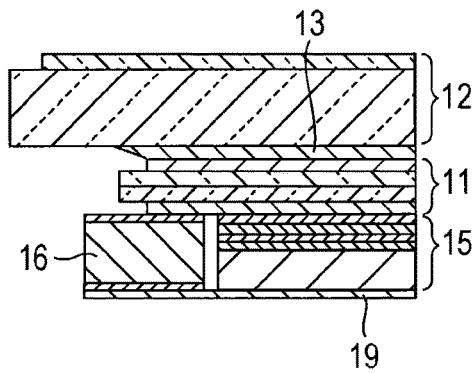

Next, as illustrated in FIG. 7B, the backlight unit 15 is glued to the display unit 11, and the backlight frame 16 is mounted so as to surround this backlight unit 15.

Figure 7C:
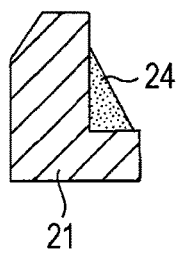

Next, as illustrated in FIG. 7C, the adhesive agent 24 is applied to the side cabinet 21 using the nozzle 30 subjected to this bend processing. Also, the adhesive agent 24 is also applied to the edge portion of the lens 12 of the display portion 2 to which the display unit 11 or backlight unit 15 has been glued, using the nozzle 30 subjected to this bend processing.

Figure 7D:
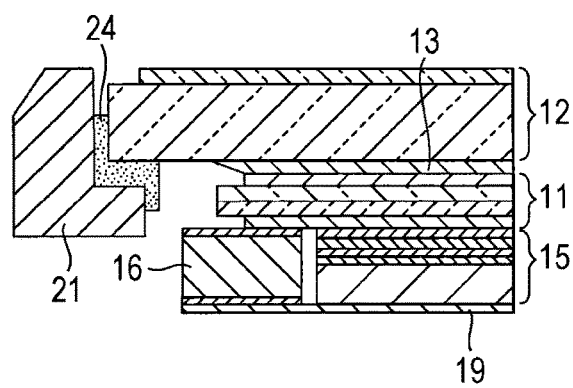

Next, as illustrated in FIG. 7D, the edge portion of the lens 12 of the display portion 2 to which the adhesive agent 24 has been applied is mounted onto the side cabinet 21 to which the adhesive agent 24 has similarly been applied, and this mounted state is maintained for a predetermined period of time (e.g., one minute to two minutes). Thus, the adhesive agent 24 is dried, and accordingly, the lens 12 of the display portion 2, and the side cabinet 21 are glued via the adhesive agent 24.

Figure 7E:
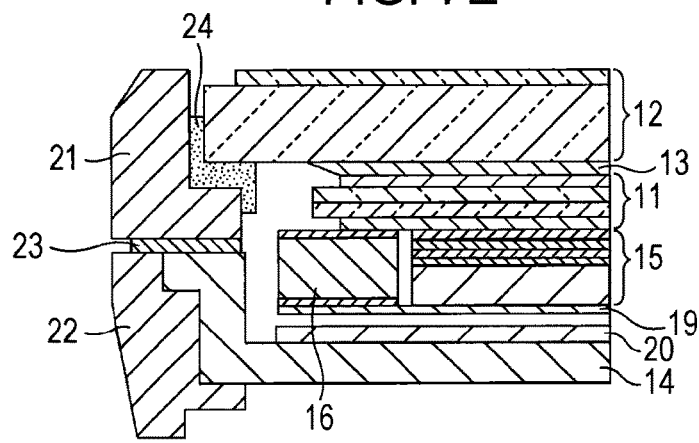

Finally, as illustrated in FIG. 7E, the cushion sheet 20 is laid between the rear frame 14 and the reflector 19 of the backlight unit 15, and also the rear cabinet 22, and the edge portion of the rear frame 14 are glued to the side cabinet 21 via a tape 23, thereby completing assembly of the rear cabinet assembly.

[Kind and Effects of Adhesive Agent]

Next, an adhesive agent whereby a certain degree of elasticity can be maintained even after hardening is used as the adhesive agent 24. For example, an adhesive agent such as "humidity hardening adhesive agent" which is hardened by moisture, "UV cure adhesive agent" which is hardened by UV, "thermosetting adhesive agent" which is hardened by heat, or the like, can be used as the adhesive agent 24.

"Humidity hardening adhesive agent" is hardened by moisture, and accordingly, workability is excellent, and suitable elasticity can be maintained even after hardening. Therefore, with the cellular phone according to the present embodiment, "humidity hardening adhesive agent" is employed as the adhesive agent 24.

This humidity hardening adhesive agent is applied to the lens 12 of the display portion 2 and the side cabinet 21, and fixed for a certain period of time using a tool as described above, and accordingly, this humidity hardening adhesive agent is hardened by moisture, and the lens 12 of the display portion 2 and the side cabinet 21 are glued.

Here, as described with reference to FIGS. 4B and 4C, in the event that the adhesive agent 24 has been applied to each of the corner 21a of the side cabinet 21, and the edge portion of the lens 12 of the display portion 2, and the edge portion of the lens 12 of the display portion 2 has been mounted to the side cabinet 21, the adhesive agent 24 flows into a gap portion 31 between the side cabinet 21 and the edge portion of the lens 12 as illustrated in FIG. 2, and is hardened.

As described above, in the case of the cellular phone according to the present embodiment, "humidity hardening adhesive agent" for maintaining suitable elasticity even after hardening is employed as the adhesive agent 24. Therefore, the adhesive agent 24 flows into the cap portion 31 and is hardened, which is the same as with a case where an elastic member such as the adhesive agent 24 is provided between the side cabinet 21, and the edge portion of the lens 12.

The adhesive agent 24 having this elasticity functions so as to absorb external shock. Therefore, the side cabinet 21 formed of a member with only rigidity being taken into consideration can be employed as the side cabinet 21. Therefore, in the case to the cellular phone according to the present embodiment, the side cabinet 21 formed of a metal member such as aluminum or the like is employed.

In other words, in the case to the cellular phone according to the present embodiment, the rigidity of this cellular phone is secured by employing the side cabinet 21 formed of a metal member, and also, the shock absorbability of this cellular phone is secured by the adhesive agent 24 having elasticity which has flowed into the gap portion 31 between the side cabinet 21 and the edge portion of the lens 12 and has been hardened.

The side cabinet 21 formed of a metal member can be employed, and accordingly, the rigidity of this cellular phone can be secured even in the event of the side cabinet 21 being reduced in size, and according to the side cabinet 21 which has been reduced in size, as illustrated in FIG. 1, a cellular phone having a good design can be provided by narrowing the width H of a portion called a frame surrounding the circumference of the display portion 2.

Advantages of First Embodiment

As is apparent from the above description, with the cellular phone serving as the first embodiment of the present disclosure, the side cabinet 21 is reduced in size by being formed of a metal member, and the adhesive agent 24 is applied to the side cabinet 21 reduced in size using the dispenser apparatus including the nozzle 30 subjected to bend processing. The adhesive agent 24 is obliquely applied to the edge portion of the lens 12 of the display portion 2 using the nozzle 30 subjected to bend processing of this dispenser apparatus.

The edge portion of the lens 12 of the display portion 2 is mounted to the side cabinet 21 to which the adhesive agent 24 has been applied, thereby gluing both.

Thus, the adhesive agent 24 flows into the cap portion 31 between the side cabinet 21 and the edge portion of the lens 12 and is hardened, and this adhesive agent 24 functions so as to absorb external shock.

Therefore, the side cabinet 21 formed of a metal member with only rigidity being taken into consideration can be employed as the side cabinet 21, and the rigidity of this cellular phone can be secured even when reducing the side cabinet 21 in size.

The side cabinet 21 can be reduced in size, and accordingly, the cellular phone having a good design can be provided by narrowing the width H of a portion called a frame surrounding the circumference of the display portion 2 as illustrated in FIG. 1.

Also, the cellular phone according to the present embodiment can secure the rigidity of this cellular phone by employing the side cabinet 21 formed of a metal member, and also secure the shock absorbability of this cellular phone using the adhesive agent 24 having elasticity which has flowed into the gap portion 31 between the side cabinet 21 and the edge portion of the lens 12 and has been hardened.

Second Embodiment

Next, a cellular phone serving as a second embodiment to which the present disclosure has been applied will be described.

The cellular phone according to the first embodiment has been an example wherein the side cabinet 21 having a generally L-letter shape cross section as illustrated in FIG. 2 and so forth.

On the other hand, the cellular phone according to the second embodiment which will be described below is an example wherein an adhesive agent holding unit is provided to the side cabinet 21 so as to fix the applied adhesive agent 24 in a stable manner.

Note that there is difference between the above first embodiment and the second embodiment only in that the adhesive agent holding unit is provided to the side cabinet 21. Therefore, hereafter, only description of this difference will be performed, and redundant description will be omitted.

Figure 8A:
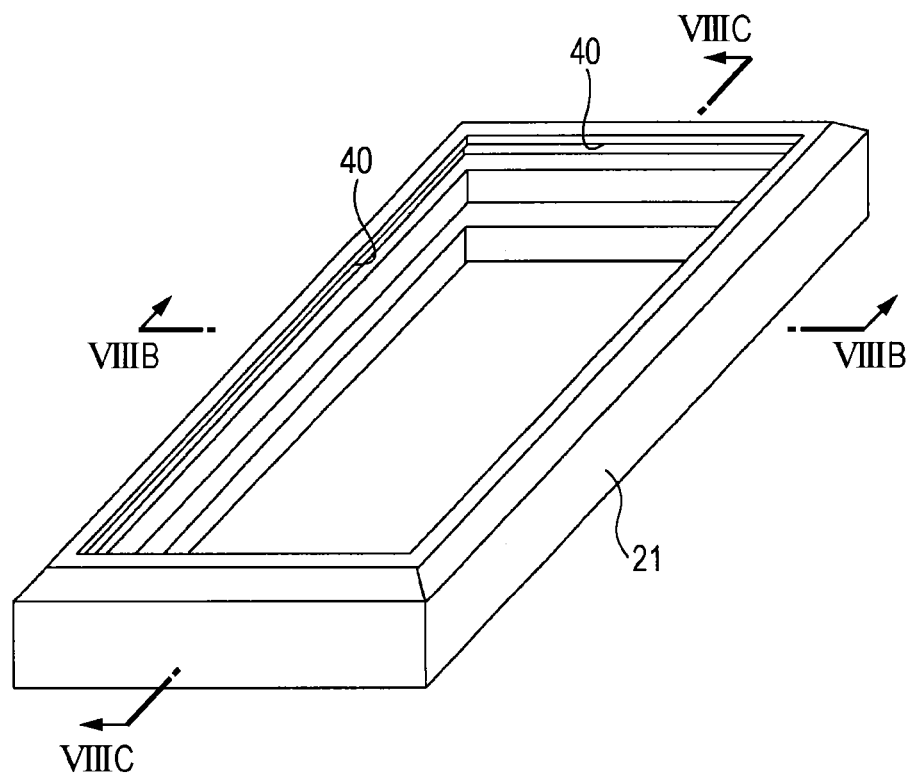
FIGS. 8A-8C are diagrams for describing a groove portion provided to a side cabinet of a cellular phone serving as a second embodiment of the present disclosure.

With the cellular phone according to the present second embodiment, a groove portion 40 is provided along the inner circumference of the side cabinet 21 provided so as to surround the outer circumference of the display portion 2 as illustrated in FIG. 8A.

Figure 8B:
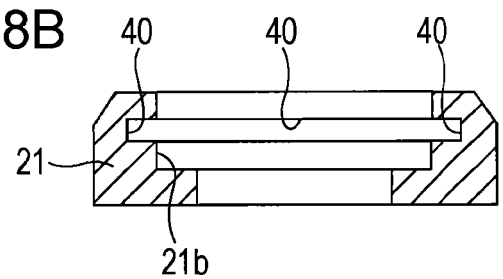

FIG. 8B illustrates a cross section obtained by cutting away the side cabinet 21 to which this groove portion 40 is provided, along line A-A illustrated in FIG. 8A. Also, FIG. 8C illustrates a cross section obtained by cutting away the side cabinet 21 to which this groove portion 40 is provided, along line B-B illustrated in FIG. 8A.

Figure 8C:
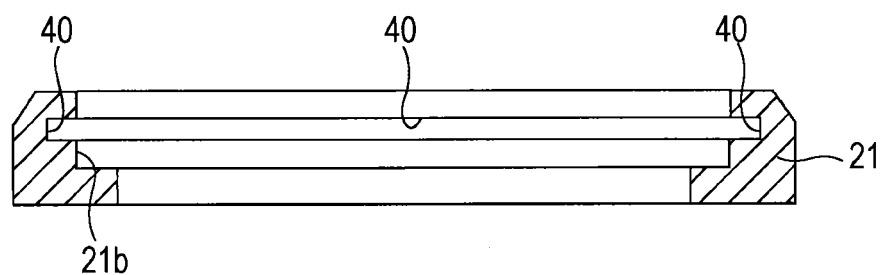

As can be understood from FIGS. 8B and 8C, the groove portion 40 is consecutively provided along the inner circumference wall portion 21b of the side cabinet 21. This groove portion 40 is configured so as to function as an adhesive agent holding unit for fixing the adhesive agent 24 applied to the side cabinet 21.

Figure 9:
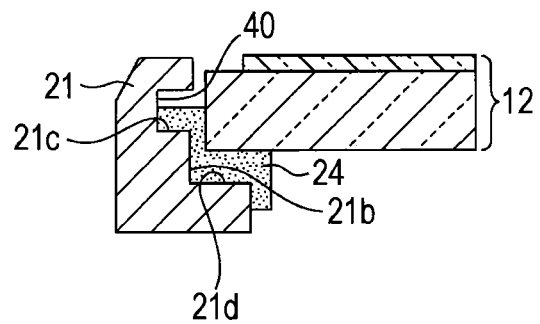
FIG. 9 is a diagram for describing the cross-sectional shape of the side cabinet of the cellular phone serving as the second embodiment of the present disclosure.

Specifically, the groove portion 40 is provided to the side cabinet 21, and accordingly, the cross-sectional shape of the side cabinet 21 forms a staircase shape with a first parallel portion 21c and a second parallel portion 21d being provided to the inner circumference wall portion 21b as illustrated in FIG. 9.

Therefore, in the event of having applied the adhesive agent 24 to this side cabinet 21 using the dispenser apparatus, the applied adhesive agent 24 can be held in a stable manner by the first parallel portion 21c and the second parallel portion 21d as illustrated in FIG. 9.

Also, in the event of having mounted the edge portion of the lens 12 of the display portion 2 to this side cabinet 21, the adhesive agent 24 flows into the groove portion 40. As described above, an adhesive agent whereby predetermined elasticity can be maintained even after hardening is employed as the adhesive agent 24.

Therefore, the cellular phone according to this second embodiment has an elastic member which is even thicker than that of the cellular phone according to the first embodiment by an amount equivalent to that of the adhesive agent 24 flowing into the groove portion 40.

As is apparent from the above description, with the cellular phone according to this second embodiment, the groove portion 40 is provided along the inner circumference of the side cabinet 21. Thus, the cross-sectional shape of the side cabinet 21 can be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 40. Therefore, shock absorptivity can be improved as compared to the cellular phone according to the first embodiment, and also the same advantages can be obtained as with the cellular phone according to the first embodiment.

Third Embodiment

Next, a cellular phone serving as a third embodiment to which the present disclosure has been applied will be described.

The cellular phone according to the second embodiment has been an example wherein the groove portion 40 is consecutively provided along the inner circumference of the side cabinet 21.

On the other hand, the cellular phone according to the third embodiment which will be described below is an example wherein a groove portion is intermittently provided along the inner circumference of the side cabinet 21 as an adhesive agent holding unit, and stability of the adhesive agent 24 applied to the side cabinet 21 is realized by this groove portion.

Note that there is difference between the above embodiments and the present third embodiment only in that the groove portion is intermittently provided to the side cabinet 21. Therefore, hereafter, only description of this difference will be performed, and redundant description will be omitted.

Figure 10A:
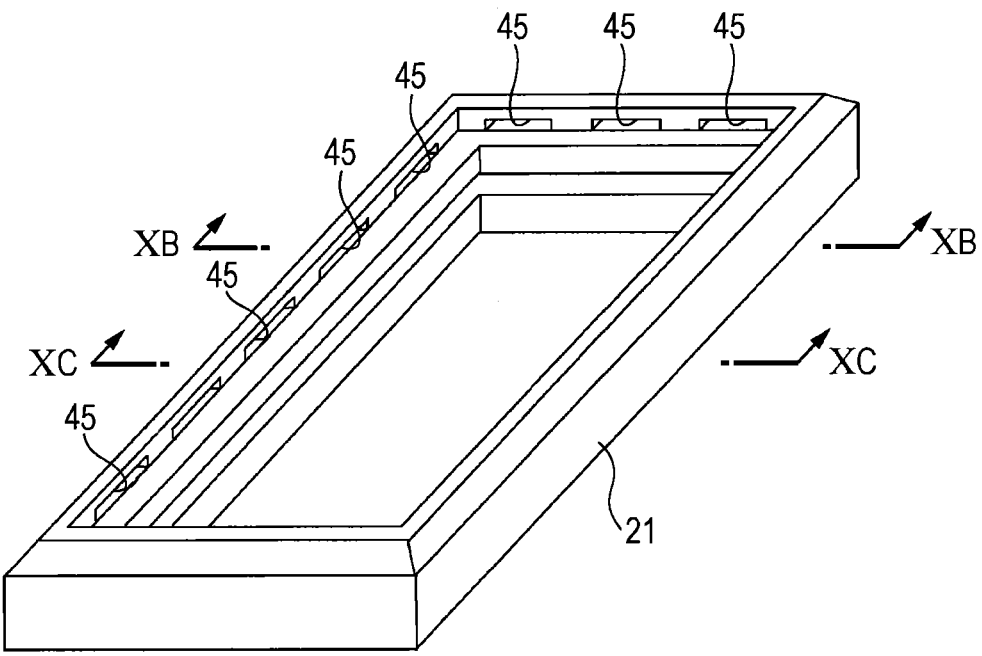
FIGS. 10A-10C are diagrams for describing a groove portion provided to a side cabinet of a cellular phone serving as a third embodiment of the present disclosure.

With the cellular phone according to the present third embodiment, a groove portion 45 having a predetermined length is intermittently provided along the inner circumference of the side cabinet 21 provided so as to surround the outer circumference of the display portion 2 as illustrated in FIG. 10A.

Figure 10B:
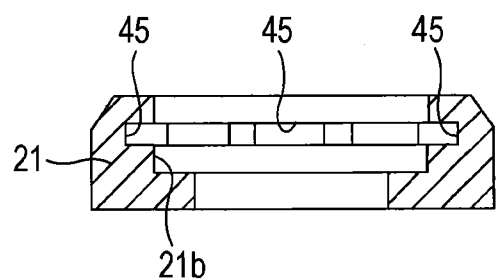

FIG. 10B illustrates a cross section (cross-sectional view with line A-A) obtained by cutting away the side cabinet 21 to which this groove portion 45 is provided, at a location where the groove portion 45 is provided as illustrated in FIG. 10A. Also, FIG. 10C illustrates a cross section (cross-sectional view with line B-B) obtained by cutting away the side cabinet 21 at a location where this groove portion 45 is not provided.

Figure 10C:
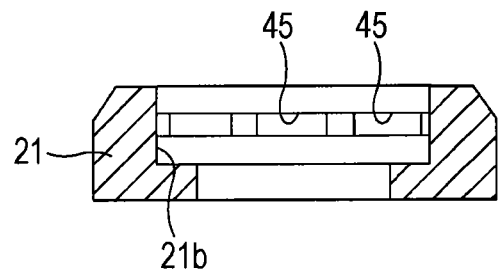

As can be understood from FIGS. 10B and 10C, the groove portion 45 is intermittently provided along the inner circumference wall portion 21b of the side cabinet 21. This groove portion 45 is configured so as to function as an adhesive agent holding unit for fixing the adhesive agent 24 applied to the side cabinet 21.

Specifically, the cross-sectional shape of the side cabinet 21 where the groove portion 45 is provided forms a staircase shape with a first parallel portion 21c and a second parallel portion 21d being provided to the inner circumference wall portion 21b as illustrated in FIG. 9 described above.

Therefore, in the event of having applied the adhesive agent 24 to this side cabinet 21 using the dispenser apparatus, the applied adhesive agent 24 can be held in a stable manner by the first parallel portion 21c and the second parallel portion 21d as illustrated in FIG. 9.

Also, in the event of having mounted the edge portion of the lens 12 of the display portion 2 to this side cabinet 21, the adhesive agent 24 flows into the groove portion 45. As described above, an adhesive agent whereby predetermined elasticity can be maintained even after hardening is employed as the adhesive agent 24.

Therefore, the cellular phone according to this third embodiment has an elastic member which is even thicker than that of the cellular phone according to the first embodiment by an amount equivalent to that of the adhesive agent 24 flowing into the groove portion 45.

As is apparent from the above description, with the cellular phone according to this third embodiment, the groove portion 45 is intermittently provided along the inner circumference of the side cabinet 21. Thus, the cross-sectional shape of the side cabinet 21 can intermittently be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 45. Therefore, shock absorptivity can be improved as compared to the cellular phone according to the first embodiment, and also the same advantages can be obtained as with the cellular phone according to the first embodiment.

Fourth Embodiment

Next, a cellular phone serving as a fourth embodiment to which the present disclosure has been applied will be described.

The cellular phone according to the second embodiment has been an example wherein the groove portion 40 is consecutively provided along the inner circumference of the side cabinet 21.

On the other hand, the cellular phone according to the fourth embodiment which will be described below is an example wherein a groove portion is consecutively provided along the inner circumference of transverse side portions of the side cabinet 21 as an adhesive agent holding unit, and stability of the adhesive agent 24 applied to the side cabinet 21 is realized by this groove portion.

Note that there is difference between the above embodiments and the present fourth embodiment only in that the groove portion is consecutively provided to the transverse side portions of the side cabinet 21. Therefore, hereafter, only description of this difference will be performed, and redundant description will be omitted.

Figure 11A:
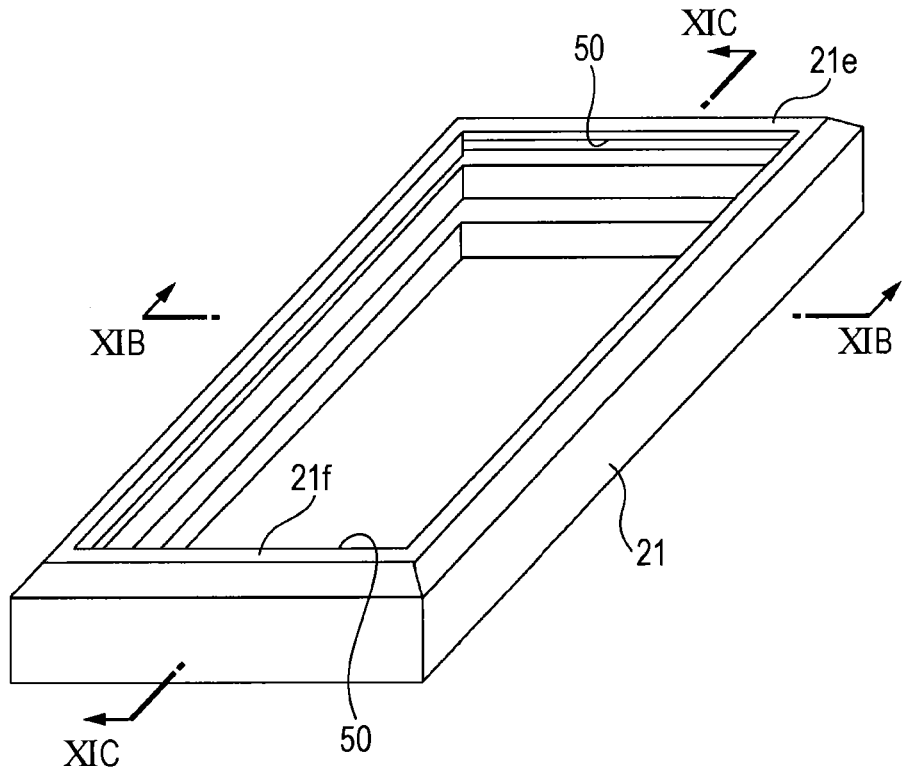
FIGS. 11A-11C are diagrams for describing a groove portion provided to a side cabinet of a cellular phone serving as a fourth embodiment of the present disclosure.

With the cellular phone according to the present fourth embodiment, a groove portion 50 is consecutively (may be intermittently such as the third embodiment) provided along the inner circumference of transverse side portions 21e and 21f of the side cabinet 21 provided so as to surround the outer circumference of the display portion 2 as illustrated in FIG. 11A.

Figure 11B:
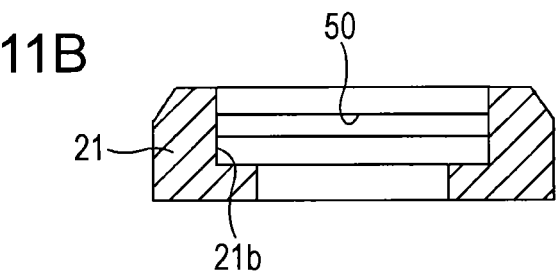

FIG. 11B illustrates a cross section (cross-sectional view with line A-A) obtained by cutting away the side cabinet 21 where this groove portion 50 is provided, along the transverse direction as illustrated in FIG. 11A. Also, FIG. 11C illustrates a cross section (cross-sectional view with line B-B) obtained by cutting away the side cabinet 21 where this groove portion 50 is provided, along the longitudinal direction as illustrated in FIG. 11A.

Figure 11C:
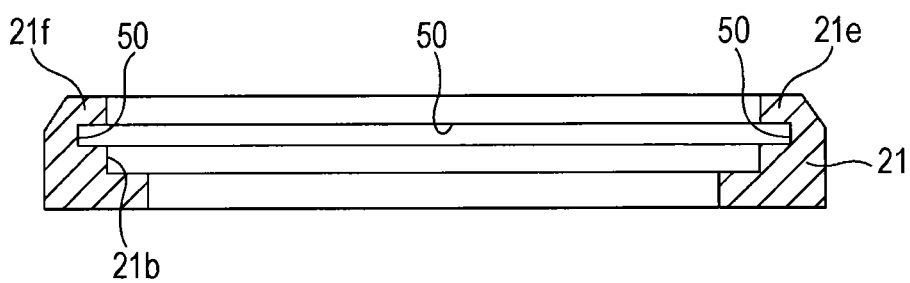

As can be understood from FIGS. 11B and 11C, the groove portion 50 is consecutively provided along the inner circumference wall portion 21b of the transverse side portions 21e and 21f of the side cabinet 21. This groove portion 50 is configured so as to function as an adhesive agent holding unit for fixing the adhesive agent 24 applied to the side cabinet 21.

Specifically, the cross-sectional shape of the side cabinet 21 where the groove portion 50 is provided forms a staircase shape with a first parallel portion 21c and a second parallel portion 21d being provided to the inner circumference wall portion 21b as illustrated in FIG. 9 described above.

Therefore, in the event of having applied the adhesive agent 24 to this side cabinet 21 using the dispenser apparatus, the applied adhesive agent 24 can be held in a stable manner by the first parallel portion 21c and the second parallel portion 21d as illustrated in FIG. 9.

Also, in the event of having mounted the edge portion of the lens 12 of the display portion 2 to this side cabinet 21, the adhesive agent 24 flows into the groove portion 50. As described above, an adhesive agent whereby predetermined elasticity can be maintained even after hardening is employed as the adhesive agent 24.

Therefore, the cellular phone according to this fourth embodiment has an elastic member which is even thicker than that of the cellular phone according to the first embodiment at the transverse side portions 21e and 21f of the side cabinet 21 by an amount equivalent to that of the adhesive agent 24 flowing into the groove portion 50.

As is apparent from the above description, with the cellular phone according to the fourth embodiment, the groove portion 50 is consecutively provided along the inner circumference wall portion 21b of the transverse side portions 21e and 21f of the side cabinet 21. Thus, the cross-sectional shapes of the transverse side portions 21e and 21f of the side cabinet 21 can be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 50. Therefore, shock absorptivity can be improved as compared to the cellular phone according to the first embodiment, and also the same advantages can be obtained as with the cellular phone according to the first embodiment.

Fifth Embodiment

Next, a cellular phone serving as a fifth embodiment to which the present disclosure has been applied will be described.

The cellular phone according to the fourth embodiment has been an example wherein the groove portion 50 is consecutively provided along the inner circumference of the transverse side portions 21e and 21f of the side cabinet 21.

On the other hand, the cellular phone according to the fifth embodiment which will be described below is an example wherein a groove portion is consecutively provided along the inner circumference of longitudinal side portions of the side cabinet 21 as an adhesive agent holding unit. This also is an example wherein the depth of this groove portion is deepened as this groove comes closer to the centers of the longitudinal side portions, thereby realizing stability of the adhesive agent 24 applied to the side cabinet 21.

Note that there is difference between the above embodiments and the present fifth embodiment only in that the groove portion is provided to the longitudinal side portions of the side cabinet 21. Therefore, hereafter, only description of this difference will be performed, and redundant description will be omitted.

Figure 12A:
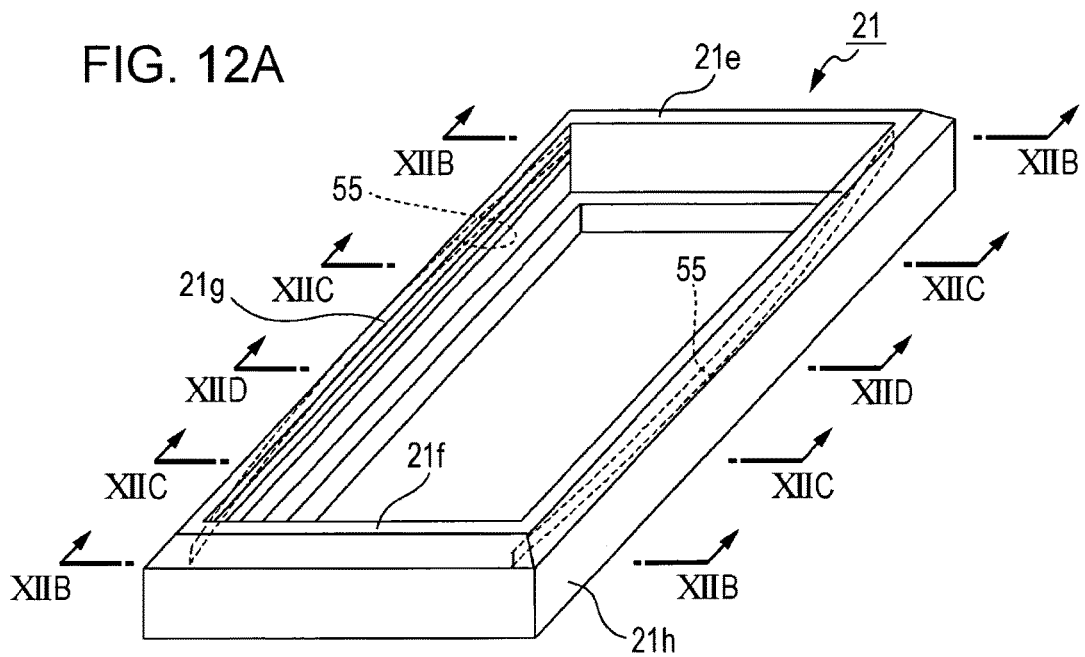
FIGS. 12A-12D are diagrams for describing a groove portion provided to a side cabinet of a cellular phone serving as a fifth embodiment of the present disclosure.

With the cellular phone according to the present fifth embodiment, a groove portion 55 is consecutively provided along the inner circumference of longitudinal side portions 21g and 21h of the side cabinet 21 provided so as to surround the outer circumference of the display portion 2 as illustrated in FIG. 12A.

Figure 12B:
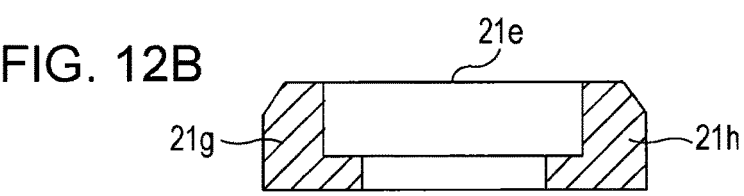

FIG. 12B illustrates a cross section (cross-sectional view with line A-A and cross-sectional view with line B-B) obtained by cutting away the side cabinet 21 where this groove portion 55 is provided, along line A-A and line B-B at locations respectively approximate to the transverse side portion 21e and transverse side portion 21f illustrated in FIG. 12A.

Figure 12C:
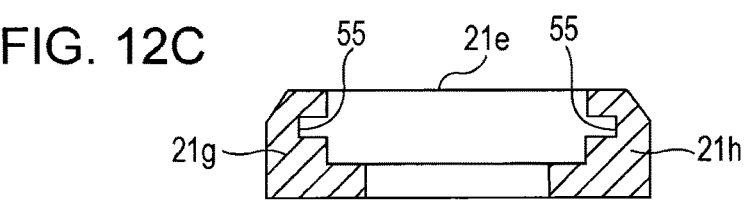
Figure 12D:
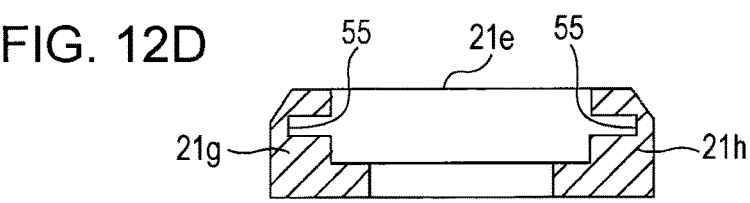

Also, FIG. 12D illustrates a cross section (cross-sectional view with line E-E) obtained by cutting away the side cabinet 21 where this groove portion 55 is provided, along line E-E at locations serving as the centers of the transverse side portion 21e and transverse side portion 21f illustrated in FIG. 12A.

FIG. 12C illustrates a cross section (cross-sectional view with line C-C and cross-sectional view with line D-D) obtained by cutting away the side cabinet 21 where this groove portion 55 is provided, along line C-C and line D-D at a location serving as the middle of line A-A and line E-E, and a location serving as the middle of line B-B and line E-E illustrated in FIG. 12A.

As can be understood from FIGS. 12B-12D, the groove portion 55 is provided so as to gradually deepen from the transverse side portion 21e to the center of the longitudinal side portion 21g of the side cabinet 21, and also provided so as to gradually shallow from the center of the longitudinal side portion 21g to the transverse side portion 21f.

In other words, the depth of the groove portion 55 shallows as the groove portion 55 comes closer to the transverse side portion 21e and transverse side portion 21f, and deepens as the groove portion 55 comes closer to the center of the longitudinal side portion 21g.

The groove portions 55 are configured to function as an adhesive agent holding unit for fixing the adhesive agent 24 applied to the side cabinet 21.

Specifically, the cross-sectional shape of the side cabinet 21 where the groove portion 55 is provided forms a staircase shape with a first parallel portion 21c and a second parallel portion 21d being provided to the inner circumference wall portion 21b as illustrated in FIG. 9 though there is some difference in the shape depending on locations as described above.

Therefore, in the event of having applied the adhesive agent 24 to this side cabinet 21 using the dispenser apparatus, the applied adhesive agent 24 can be held in a stable manner by the first parallel portion 21c and the second parallel portion 21d as illustrated in FIG. 9.

Also, in the event of having mounted the edge portion of the lens 12 of the display portion 2 to this side cabinet 21, the adhesive agent 24 flows into the groove portion 55. As described above, an adhesive agent whereby predetermined elasticity can be maintained even after hardening is employed as the adhesive agent 24.

Therefore, the cellular phone according to this fifth embodiment has an elastic member which is even thicker than that of the cellular phone according to the first embodiment at the transverse side portions 21e and 21f of the side cabinet 21 by an amount equivalent to that of the adhesive agent 24 flowing into the groove portion 55. The thickness of the elastic member according to this adhesive agent 24 thickens as the elastic member comes closer to the centers of the longitudinal side portions 21g and 21h of the side cabinet 21.

As is apparent from the above description, with the cellular phone according to the fifth embodiment, the groove portion 55 is provided along the inner circumference wall portion 21b of the longitudinal side portions 21g and 21h of the side cabinet 21. The depth of this groove portion 55 deepens as the groove portion comes closer to the centers of the longitudinal side portions 21g and 21h.

Thus, the cross-sectional shapes of the longitudinal side portions 21g and 21h of the side cabinet 21 can be formed in a staircase shape, and the adhesive agent 24 applied by the dispenser apparatus can be held in a stable manner.

In the event of having mounted the edge portion of the lens 12 of the display portion 2 to the side cabinet 21, an elastic member which is even thicker than that of the cellular phone according to the first embodiment can be formed by the adhesive agent 24 which flows into the groove portion 55. Also, the thickness of the elastic member according to this adhesive agent 24 can be thickened as the elastic member comes closer to the centers of the longitudinal side portions 21g and 21h of the side cabinet 21. Therefore, shock absorptivity can be improved as compared to the cellular phone according to the first embodiment, and also the same advantages can be obtained as with the cellular phone according to the first embodiment.

Note that, with this example, an arrangement has been made wherein though the depth of the groove portion 55 deepens as the groove portion 55 comes closer to the centers of the longitudinal side portions 21g and 21h of the side cabinet 21, an arrangement may be made wherein this groove portion 55 is provided to the transverse side portions 21e and 21f of the side cabinet 21, and the depth of the groove portion 55 deepens as the groove portion 55 comes closer to the centers of the transverse side portions 21e and 21f. Thus, in the same way as described above, this can improve shock absorbability as compared to the cellular phone according to the first embodiment, and also the same advantages as with the cellular phone according to the first embodiment can be obtained.

Sixth Embodiment

Next, a cellular phone serving as a sixth embodiment to which the present disclosure has been applied will be described.

The cellular phones according to the second through fifth embodiments have been examples wherein the groove portions 40, 45, 50 and 55 having depth along the width direction of the side cabinet 21 are provided, thereby realizing stable holding of the applied adhesive agent 24.

On the other hand, the cellular phone serving as the present sixth embodiment is an example wherein a groove portion having depth along the thickness direction of the side cabinet 21 is provided, thereby realizing stable holding of the applied adhesive agent 24.

Note that there is difference between the above second through fifth embodiments and the present sixth embodiment only in that the groove portion having depth along the thickness direction of the side cabinet 21 is provided. Therefore, hereafter, only description of this difference will be performed, and redundant description will be omitted.

Figure 13:
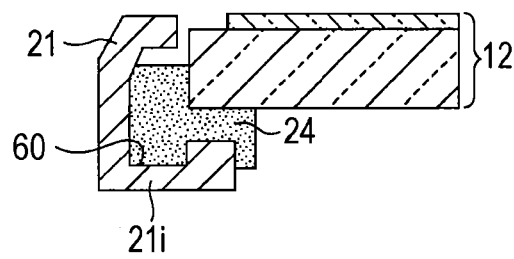
FIG. 13 is a cross-sectional view obtained by cutting away a side cabinet of a cellular phone according to a sixth embodiment of the present disclosure along the transverse direction of this cellular phone.

FIG. 13 illustrates a cross-sectional view obtained by cutting away the side cabinet 21 of the cellular phone according to the present sixth embodiment along the transverse direction of this cellular phone.

As can be understood from this FIG. 13, the cellular phone according to the present sixth embodiment includes a groove portion 60 having depth along the thickness direction of this side cabinet 21, provided along a bottom side portion 21i of the side cabinet 21 provided so as to surround the outer circumference of the display portion 2. This groove portion 60 is configured to function as an adhesive agent holding unit.

Note that this groove portion 60 may consecutively be provided to the side portions 21e, 21f, 21g, and 21h of the side cabinet 21, or may intermittently be provided with a certain interval. Also, this groove portion 60 may consecutively or intermittently be provided to only the transverse side portions 21e and 21f of the side cabinet 21, or may consecutively or intermittently be provided to only the longitudinal side portions 21g and 21h of the side cabinet 21. Also, this groove portion 60 may be provided so as to deepen as the groove portion 60 comes closer to the centers of the longitudinal side portions 21g and 21h (or transverse side portions 21e and 21f) of the side cabinet 21 as illustrated in FIGS. 12A-12D.

In the event of having applied the adhesive agent 24 to such a side cabinet 21 using the dispenser apparatus, the applied adhesive agent 24 can be held in a stable manner by the groove portion 60 as illustrated in FIG. 13, as if adhesive fluid were put into a container.

Also, the adhesive agent 24 is held at the groove portion 60 having depth along the thickness direction of the side cabinet 21, and accordingly, a great amount of adhesive agent 24 can be held in a stable manner. Therefore, in the event that this held great amount of adhesive agent 24 has been hardened, a thick elastic member can be formed, and accordingly, further improvement in shock absorbability can be realized, and also the same advantages as with the above embodiments can be obtained.

Seventh Embodiment

Next, a cellular phone serving as a seventh embodiment to which the present disclosure has been applied will be described.

The cellular phones according to the second through fifth embodiments have been examples wherein the groove portions 40, 45, 50 and 55 having depth along the width direction of the side cabinet 21 are provided, thereby realizing stable holding of the applied adhesive agent 24.

On the other hand, the cellular phone serving as the present seventh embodiment is an example wherein a groove portion having depth that gradually deepens toward the corner portion 21a of this side cabinet 21 is provided to the bottom side portion 21i of the side cabinet 21, thereby realizing stable holding of the applied adhesive agent 24.

Note that there is difference between the above second through fifth embodiments and the present seventh embodiment only in that such a groove portion is provided. Therefore, hereafter, only description of this difference will be performed, and redundant description will be omitted.

Figure 14:
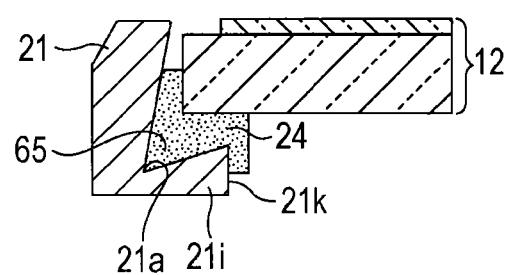
FIG. 14 is a cross-sectional view obtained by cutting away a side cabinet of a cellular phone according to a seventh embodiment of the present disclosure along the transverse direction of this cellular phone.

FIG. 14 illustrates a cross-sectional view obtained by cutting away the side cabinet 21 of the cellular phone according to the present seventh embodiment along the transverse direction of this cellular phone.

As can be understood from this FIG. 14, the cellular phone according to the present seventh embodiment includes a groove portion 65 having depth along the thickness direction of this side cabinet 21, formed by subjecting the bottom side portion 21i of the side cabinet 21 provided so as to surround the outer circumference of the display portion 2 to notch processing so as to be gradually inclined downward from a side wall portion 21k of this bottom side portion 21i to the corner portion 21a on the inner circumference side of the side cabinet 21. This groove portion 65 is configured to function as an adhesive agent holding unit.

Note that this groove portion 65 may consecutively be provided to the side portions 21e, 21f, 21g, and 21h of the side cabinet 21, or may intermittently be provided with a certain interval. Also, this groove portion 65 may consecutively or intermittently be provided to only the transverse side portions 21e and 21f of the side cabinet 21, or may consecutively or intermittently be provided to only the longitudinal side portions 21g and 21h of the side cabinet 21. Also, this groove portion 65 may be provided so as to deepen as the groove portion 65 comes closer to the centers of the longitudinal side portions 21g and 21h (or transverse side portions 21e and 21f) of the side cabinet 21 as illustrated in FIGS. 12A-12D.

In the event of having applied the adhesive agent 24 to such a side cabinet 21 using the dispenser apparatus, the adhesive agent pools in the groove portion 65 inclined downward as illustrated in FIG. 14, and the applied adhesive agent 24 can be held in a stable manner by the groove portion 65.

Also, the adhesive agent 24 is held at the groove portion 65 having depth along the thickness direction of the side cabinet 21, and accordingly, a great amount of adhesive agent 24 can be held in a stable manner. Therefore, in the event that this held great amount of adhesive agent 24 has been hardened, a thick elastic member can be formed, and accordingly, further improvement in shock absorbability can be realized, and also the same advantages as with the above embodiments can be obtained.

Eighth Embodiment

Next, a cellular phone serving as an eighth embodiment to which the present disclosure has been applied will be described.

With the cellular phones according to the above embodiments, the inner circumference wall portion 21b of the side cabinet 21 has had a shape that linearly rises along the thickness direction of this side cabinet 21.

On the other hand, the cellular phone serving as the present eighth embodiment is an example wherein the inner circumference wall portion 21b of the side cabinet 21 has been subjected to inclination processing so as to have an angle in accordance with the bend angle of the nozzle 30 subjected to bend processing as described above.

Note that there is difference between the above embodiments and the present eighth embodiment only in that the inner circumference wall portion 21b of the side cabinet 21 has been subjected to inclination processing in this way. Therefore, hereafter, only description of this difference will be performed, and redundant description will be omitted.

Figure 15:
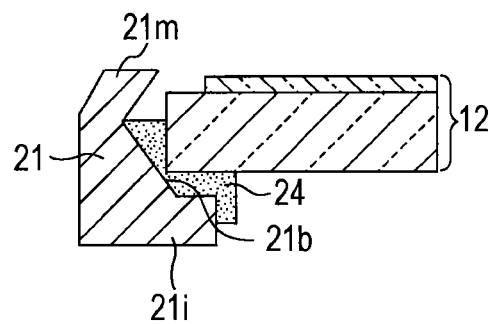
FIG. 15 is a cross-sectional view obtained by cutting away a side cabinet of a cellular phone according to an eighth embodiment of the present disclosure along the transverse direction of this cellular phone.

FIG. 15 illustrates a cross-sectional view obtained by cutting away the side cabinet 21 of the cellular phone according to the present eighth embodiment along the transverse direction of this cellular phone.

As can be understood from this FIG. 15, with the cellular phone according to the present eighth embodiment, the inner circumference wall portion 21b has been subjected to inclination processing so as to gradually incline from the upper side portion 21m to the bottom side portion 21i of the side cabinet 21 provided so as to surround the outer circumference of the display portion 2 to have the same inclination angle as the bend angle of the nozzle 30 subjected to bend processing.

Note that the inclination processing of such an inner circumference wall portion 21b may consecutively be provided to the side portions 21e, 21f, 21g, and 21h of the side cabinet 21, or may intermittently be provided with a certain interval. Also, the inclination processing of this inner circumference wall portion 21b may consecutively or intermittently be provided to only the transverse side portions 21e and 21f of the side cabinet 21, or may consecutively or intermittently be provided to only the longitudinal side portions 21g and 21h of the side cabinet 21.

In the event of having applied the adhesive agent 24 to such a side cabinet 21 using the dispenser apparatus, the bend angle of the nozzle 30 of this dispenser apparatus is the same angle as the inclination angle of the inner circumference wall portion 21b of the side cabinet 21, and accordingly, the adhesive agent 24 from the nozzle 30 is emitted generally perpendicularly to the inner circumference wall portion 21b of the side cabinet 21, and the adhesive agent 24 is applied to the inner circumference wall portion 21b of this side cabinet 21.

Thus, the adhesive agent 24 can more accurately be applied to the side cabinet 21, improvement in the yield of applied width can be realized, and also the same advantages as with the above embodiments can be obtained.

Ninth Embodiment

Next, a cellular phone serving as a ninth embodiment to which the present disclosure has been applied will be described.

The cellular phone according to the above eighth embodiment is an example wherein the inner circumference wall portion 21b of the side cabinet 21 has been subjected to inclination processing so as to have an angle in accordance with the bend angle of the nozzle 30 subjected to bend processing of the dispenser apparatus.

On the other hand, the cellular phone serving as the present ninth embodiment is an example wherein the inner circumference wall portion 21b of the side cabinet 21, and the edge portion of the lens 12 of the display portion 2 are each subjected to inclination processing so as to have an angle in accordance with the bend angle of the nozzle 30 subjected to bend processing of the dispenser apparatus.

Note that there is difference between the above eighth embodiment and the present ninth embodiment only in that the edge portion of the lens 12 of the display portion 2 has been subjected to inclination processing in this way. Therefore, hereafter, only description of this difference will be performed, and redundant description will be omitted.

Figure 16:
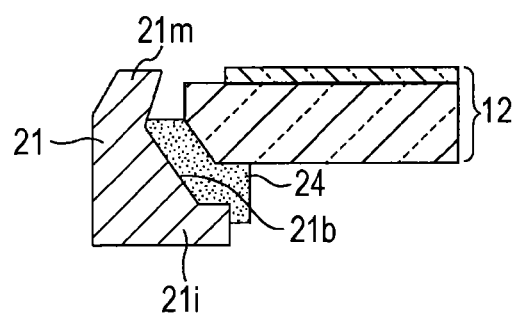
FIG. 16 is a cross-sectional view obtained by cutting away a side cabinet of a cellular phone according to a ninth embodiment of the present disclosure along the transverse direction of this cellular phone.
Figure 17:
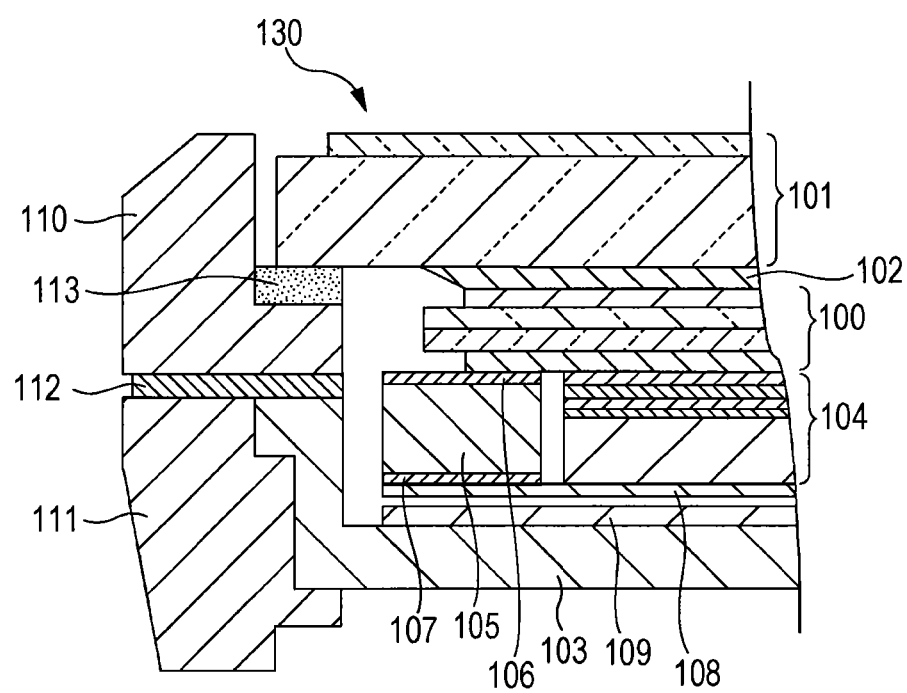
FIG. 17 is a cross-sectional view obtained by cutting away a conventional cellular phone in the transverse direction.
Figure 18A:
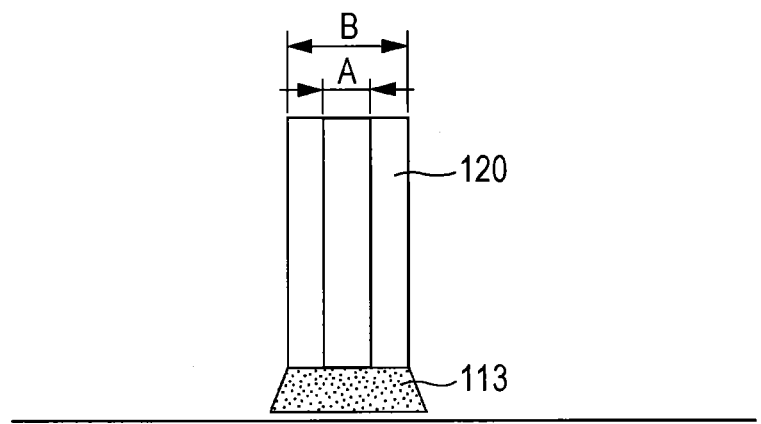
FIGS. 18A and 18B are diagrams for describing a nozzle of a common dispenser apparatus.
Figure 18B:
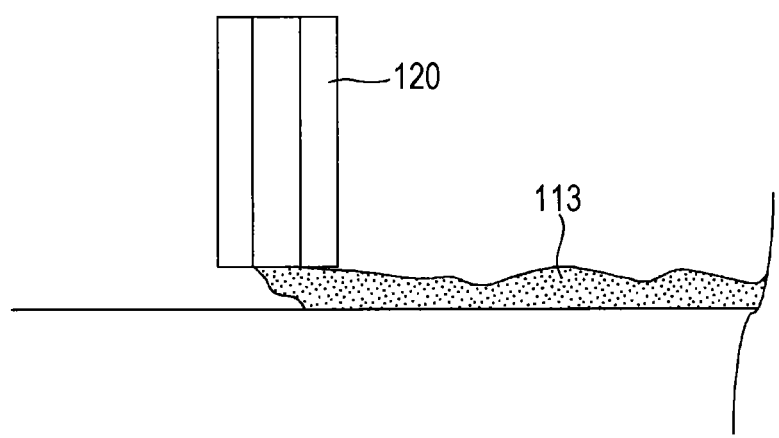
Figure 19A:
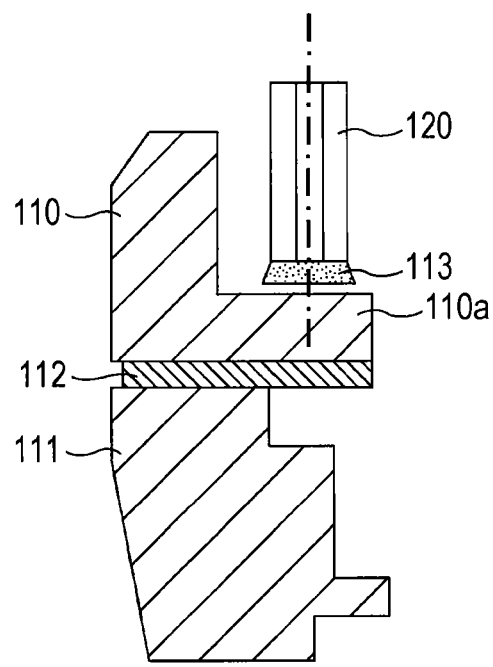
FIGS. 19A and 19B are diagrams illustrating a scene where an adhesive agent has been applied to a side cabinet and an edge portion of a lens of a display portion of a conventional cellular phone using a nozzle of a dispenser apparatus.
Figure 19B:
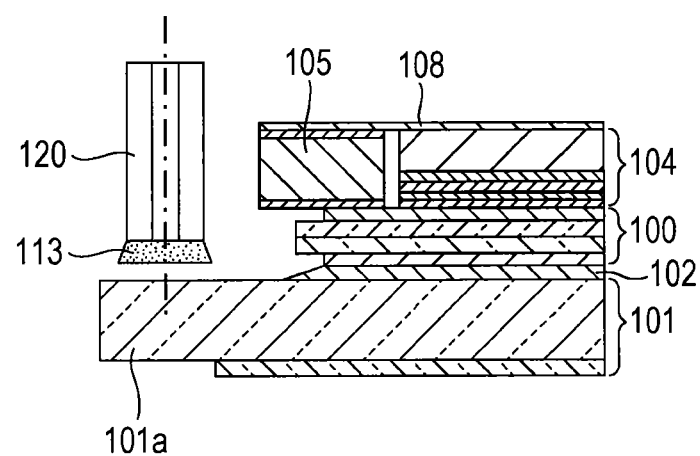
Figure 20:
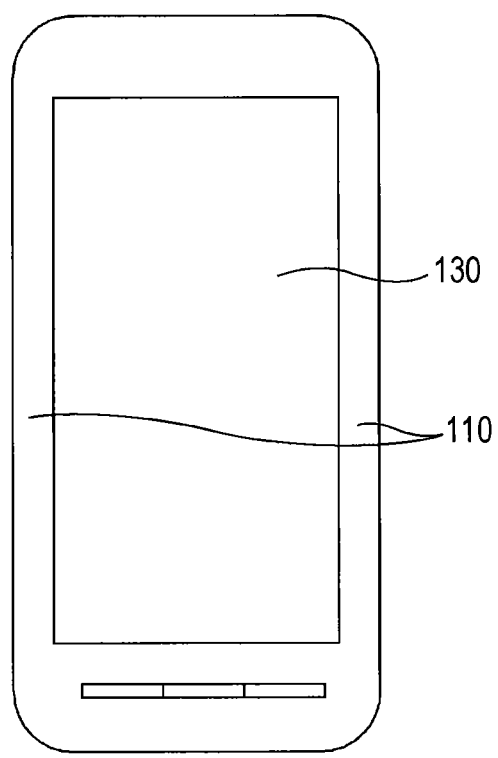
FIG. 20 is a front view of a conventional cellular phone.

FIG. 16 illustrates a cross-sectional view obtained by cutting away the side cabinet 21 of the cellular phone according to the present ninth embodiment along the transverse direction of this cellular phone.

As can be understood from this FIG. 16, with the cellular phone according to the present ninth embodiment, the inner circumference wall portion 21b has been subjected to inclination processing so as to gradually incline from the upper side portion 21m to the bottom side portion 21i of the side cabinet 21 provided so as to surround the outer circumference of the display portion 2 to have the same inclination angle as the bend angle of the nozzle 30 subjected to bend processing.

Note that the inclination processing of such an inner circumference wall portion 21b may consecutively be provided to the side portions 21e, 21f, 21g, and 21h of the side cabinet 21, or may intermittently be provided with a certain interval. Also, the inclination processing of this inner circumference wall portion 21b may consecutively or intermittently be provided to only the transverse side portions 21e and 21f of the side cabinet 21, or may consecutively or intermittently be provided to only the longitudinal side portions 21g and 21h of the side cabinet 21.

Also, as can be understood from this FIG. 16, with the cellular phone according to the present ninth embodiment, the edge portion of the lens 12 of the display portion 2 has been subjected to inclination processing so as to have the same inclination angle as with the inner circumference wall portion 21b of the side cabinet 21.

In other words, with the cellular phone according to the present ninth embodiment, the edge portion of the lens 12 of the display portion 2 has been subjected to inclination processing so as to have the same inclination angle as the bend angle of the nozzle 30 subjected to bend processing of the dispenser apparatus.

In the event of having applied the adhesive agent 24 to such a side cabinet 21 using the dispenser apparatus, the bend angle of the nozzle 30 of this dispenser apparatus is the same angle as the inclination angle of the inner circumference wall portion 21b of the side cabinet 21, and accordingly, the adhesive agent 24 from the nozzle 30 is emitted generally perpendicularly to the inner circumference wall portion 21b of the side cabinet 21, and the adhesive agent 24 is applied to the inner circumference wall portion 21b of this side cabinet 21.

Similarly, in the event of having applied the adhesive agent 24 to the edge portion of the lens 12 of the display portion 2, the bend angle of the nozzle 30 of this dispenser apparatus is the same angle as the inclination angle of the edge portion of the lens 12, and accordingly, the adhesive agent 24 from the nozzle 30 is emitted generally perpendicularly to the edge portion of the lens 12, and the adhesive agent 24 is applied to the edge portion of this lens 12.

Thus, the adhesive agent 24 can more accurately be applied to the side cabinet 21, and the edge portion of the lens 12, and also improvement in the yield of applied width can be realized.

Also, as illustrated in FIG. 16, the amount of the adhesive agent between the inner circumference wall portion 21*b* of the side cabinet 21, and the edge portion of the lens 12 can be increased, improvement in shock absorbability can be realized, and also the same advantages as with the above embodiments can be obtained.

[Apparatuses Provided from Embodiments]

(1) An information processing apparatus comprising:
a display portion;
a casing including an inner circumference wall portion that faces a side wall of the display portion and an inner circumference bottom plane portion that faces a rear surface of the display portion, wherein
the display portion is secured to the inner circumference wall portion and the inner circumference bottom plane portion of the casing with an adhesive agent.

(2) The information processing apparatus of (1), wherein the casing is formed from a metallic material.

(3) The information processing apparatus of (1) or (2), wherein
the casing is formed from one of Acrylonitrile, Butadiene, Styrene and PolyEthylene Terephthalate.

(4) The information processing apparatus of any of (1) to (3), wherein
the adhesive agent is one of a humidity hardening adhesive agent, an ultraviolet cure adhesive agent and a thermosetting adhesive agent (5) The information processing apparatus of any of (1) to (4), further comprising:
an adhesive agent holding unit formed on the inner circumference wall portion of the casing configured to hold the applied adhesive agent.

(6) The information processing apparatus of any of (1) to (5), further comprising:
a groove portion consecutively provided along the inner circumference wall portion of the casing configured to hold the applied adhesive agent.

(7) The information processing apparatus of any of (1) to (6), further comprising:
a plurality of groove portions intermittently provided along the inner circumference wall portion of the casing configured to hold the applied adhesive agent.

(8) The information processing apparatus of any of (1) to (7), wherein
the inner circumference wall portion of the casing is rectangular shaped.

(9) The information processing apparatus of (8), further comprising:
a plurality of groove portions consecutively provided along two opposing sides of the rectangular shaped inner circumference wall portion of the casing configured to hold the applied adhesive agent.

(10) The information processing apparatus of (9), wherein
the plurality of groove portions gradually deepen from a transverse side portion of each of the two opposing sides of the rectangular shaped inner circumference wall portion of the casing to a center of the two opposing sides.

(11) The information processing apparatus of (8), further comprising:
a plurality of groove portions intermittently provided along two opposing sides of the rectangular shaped inner circumference wall portion of the casing configured to hold the applied adhesive agent.

(12) The information processing apparatus of any of (1) to (4), further comprising:
a groove portion having a depth along a thickness direction of the casing consecutively provided along the inner circumference wall portion of the casing configured to hold the applied adhesive agent.

(13) The information processing apparatus of any of (1) to (4), further comprising:
a groove portion having a depth along a thickness direction of the casing intermittently provided along the inner circumference wall portion of the casing configured to hold the applied adhesive agent.

(14) The information processing apparatus of any of (1) to (4), wherein
a first planar surface of the inner circumference wall portion and a second planar surface of the inner circumference bottom plane portion form an acute angle.

(15) The information processing apparatus of any of (1) to (4), wherein
a first planar surface of the inner circumference wall portion and a second planar surface of the inner circumference bottom plane portion form an obtuse angle.

(16) The information processing apparatus of (15), wherein
an outer circumference surface of the display portion as a planar surface that is parallel to the first planar surface of the inner circumference wall portion.

[Modification]

Though the above embodiments are embodiments wherein the present disclosure has been applied to a cellular phone, the present disclosure can be applied to electronic equipment including a display portion, for example, such as PHS phones (PHS: Personal Handyphone System), PDA apparatuses (PDA: Personal Digital Assistant), electronic camera apparatuses, electronic video camera apparatuses, portable game machines, notebook-type personal computer devices, and so forth. The same advantages as with the above embodiments can be obtained in any of these case.

Finally, embodiments other than the above embodiments may be made as an embodiment of the present disclosure by various modifications, various combinations, and so forth according to design or other factors within the scope of the Claims of the present disclosure or equivalent to the Claims. Therefore, the present disclosure is not restricted to the above embodiments. This will be understood by one skilled in the art as a matter of course.

The invention claimed is:

1. An information processing apparatus comprising:
a display portion;
a casing including an inner circumference wall portion that faces a side wall of the display portion and an inner circumference bottom plane portion that faces a rear surface of the display portion, the inner circumference wall portion including walls that oppose each other and are parallel to each other; and
a humidity hardening adhesive agent that maintains elasticity after hardening securing the display portion to the inner circumference wall portion and the inner circumference bottom plane portion of the casing, the adhesive agent being applied to the walls, wherein each of the walls and a corresponding portion of the inner circumference bottom plane portion define a plurality of surfaces arranged in a staircase shape, and wherein, with regard to each of the walls and the corresponding portion of the inner circumference bottom plane portion at least five of the surfaces are in contact with the humidity hardening adhesive agent.

2. The information processing apparatus of claim 1, wherein
the casing is formed from a metallic material.

3. The information processing apparatus of claim 1, wherein
the casing is formed from one of Acrylonitrile, Butadiene, Styrene and PolyEthylene Terephthalate.

4. The information processing apparatus of claim 1, further comprising:
an adhesive agent holding unit formed on the walls configured to hold the applied adhesive agent.

5. The information processing apparatus of claim 1, further comprising:
a groove portion consecutively provided along the walls configured to hold the applied adhesive agent.

6. The information processing apparatus of claim 1, further comprising:
a plurality of groove portions intermittently provided along the walls configured to hold the applied adhesive agent.

7. The information processing apparatus of claim 1, wherein
the inner circumference wall portion of the casing is rectangular shaped.

8. The information processing apparatus of claim 7, further comprising:
a plurality of groove portions consecutively provided along the walls configured to hold the applied adhesive agent.

9. The information processing apparatus of claim 8, wherein
the plurality of groove portions gradually deepen from a transverse side portion of each of the walls to a center of said each of the walls.

10. The information processing apparatus of claim 7, further comprising:
a plurality of groove portions intermittently provided along the walls configured to hold the applied adhesive agent.

11. The information processing apparatus of claim 1, further comprising:
a groove portion having a depth along a thickness direction of the casing consecutively provided along the walls configured to hold the applied adhesive agent.

12. The information processing apparatus of claim 1, further comprising:
a groove portion having a depth along a thickness direction of the casing intermittently provided along the walls configured to hold the applied adhesive agent.

13. The information processing apparatus of claim 1, wherein
a first planar surface of the inner circumference wall portion and a second planar surface of the inner circumference bottom plane portion form an acute angle.

14. The information processing apparatus of claim 1, wherein
a first planar surface of the inner circumference wall portion and a second planar surface of the inner circumference bottom plane portion form an obtuse angle.

15. The information processing apparatus of claim 14, wherein
an outer circumference surface of the display portion has a planar surface that is parallel to the first planar surface of the inner circumference wall portion.

* * * * *